Patented Oct. 15, 1946

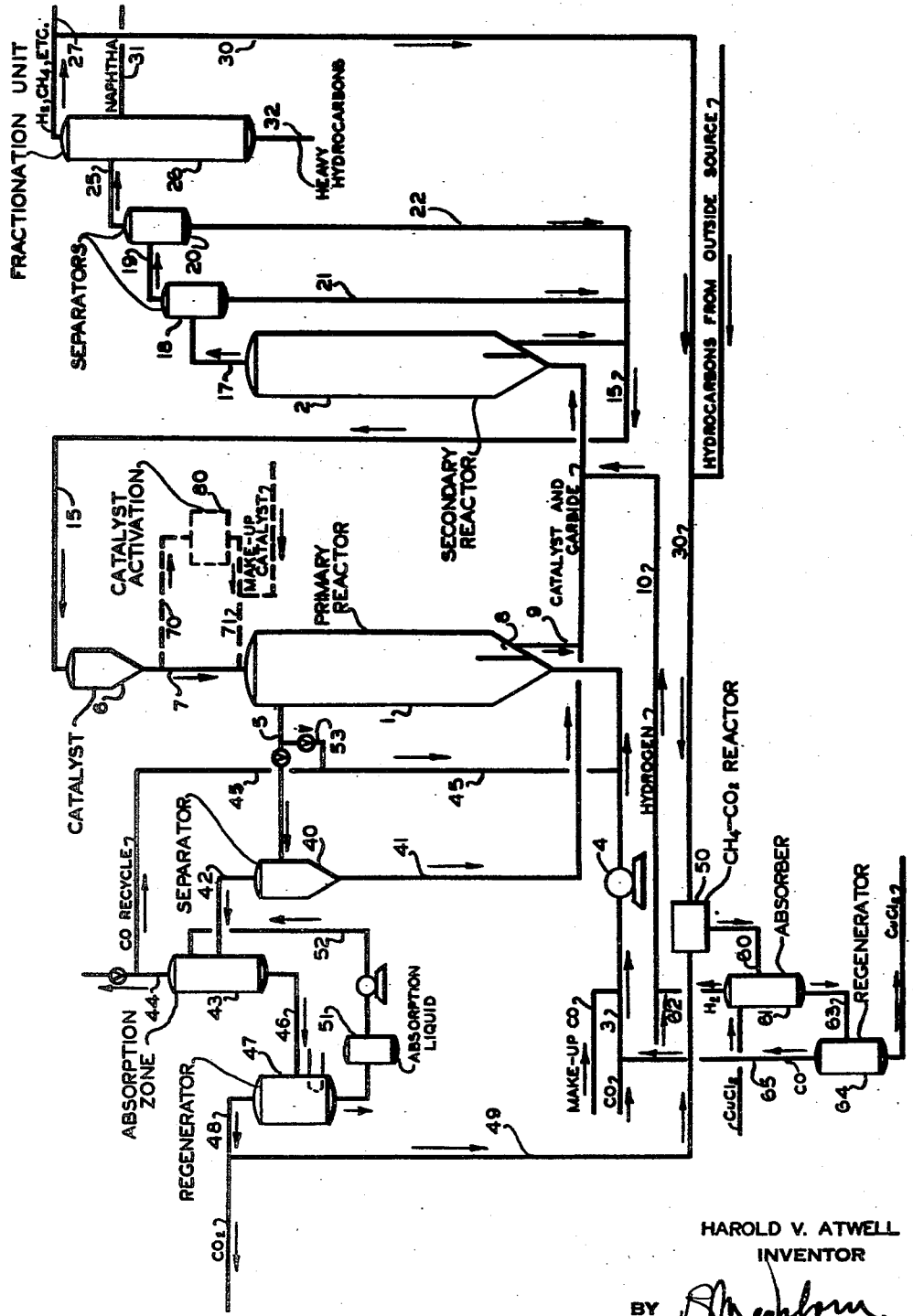

2,409,235

UNITED STATES PATENT OFFICE 2,409,235

CONTINUOUS PROCESS FOR EFFECTING CATALYTIC REACTIONS

Harold V. Atwell, Beacon, N. Y., assignor, by mesne assignments, to The Texas Company, New York, N. Y., a corporation of Delaware Application December 18, 1943, Serial No. 514,768

14 Claims. (Cl. 260—676)

This invention relates to a continuous process for effecting catalytic reactions, and more particularly for effecting catalytic conversion of gaseous reactants by the action of a solid catalyst in finely divided or powdered form for the production of normally liquid carbonaceous compounds.

The invention contemplates forming normally liquid compounds from carbon and hydrogen by the action of a solid hydrogenating catalyst containing a carbide forming metal, such as, cobalt, iron, or nickel. More specifically, the invention contemplates a two-stage continuous process, in the first stage of which the catalyst is subjected to contact with a volatile carbon compound under conditions adapted to form metallic carbide, and in the second stage of which the catalyst containing metallic carbide is separately subjected to contact with hydrogen under conditions adapted to produce normally liquid carbonaceous compounds, such as hydrocarbons.

In accordance with the invention, a volatile carbon compound, such as carbon monoxide is subjected to contact with a solid catalyst containing cobalt, iron, or nickel at a temperature in the range about 350 to 425° F., whereby formation of the carbide of cobalt occurs to a substantial extent in accordance with the following chemical equation:

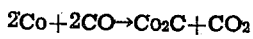

$$2Co + 2CO \rightarrow Co_2C + CO_2$$

The catalyst containing the carbide of cobalt or other metal is then passed to a separate treating zone wherein it is treated with hydrogen at a somewhat lower temperature in the range about 200 to 400° F. and under conditions such that the carbide undergoes decomposition, the liberated carbon reacting with hydrogen to form hydrocarbon products mainly heavier than methane.

The catalyst of decreased carbide content is withdrawn and returned to the primary zone for further treatment with carbon monoxide.

Carbon dioxide produced in the primary stage is discharged therefrom and may be reduced to carbon monoxide by contact with carbon or may be reacted with methane to produce carbon monoxide and hydrogen by conventional methods. The carbon monoxide so obtained is thus available for recycling to the primary reaction stage. Likewise, hydrogen obtained by reacting methane with carbon dioxide is available for recycling to the secondary stage of the process.

The methane used for reaction with carbon dioxide advantageously includes that obtained by separation from the hydrocarbon products of the process. Additional methane may be obtained from an outside source. Instead of methane, a methane fraction may thus be obtained from the hydrocarbon products and used for reacting with the carbon dioxide. The gaseous hydrocarbon so used for this purpose may comprise methane, ethane, propane, butane, or a mixture thereof.

A feature of the invention involves conducting the two steps of the conversion process in separate reaction zones with provision for the continuous circulation of the catalyst from one zone to the other, and this catalyst circulation may be effected by suspension in gas or liquid or by other mechanical means.

A further feature involves synthesizing hydrocarbons from carbon and hydrogen without the formation of water. Avoiding the formation of water greatly reduces the complexity and energy requirements. Also, as already intimated, a further feature involves utilizing carbon dioxide formed in the primary stage for reaction with a normally gaseous hydrocarbon at elevated temperature to produce carbon monoxide and hydrogen required in the conversion reactions.

Advantageously, the reaction in the primary stage is conducted in the substantial absence of hydrogen; while the reaction in the secondary stage is carried out in the substantial absence of the carbon monoxide or other volatile carbon compound.

Other volatile carbon compounds useful in effecting the primary reaction comprise normally gaseous olefins and paraffins, and vaporizable metallic compounds, such as iron carbonyl. Under certain conditions carbon dioxide may be effective.

In order to illustrate the invention, reference will now be made to the accompanying drawing, comprising a diagram of flow for effecting syntheses of hydrocarbons having two or more carbon atoms per molecule, including normally liquid hydrocarbons, from hydrogen and carbon monoxide.

As indicated in the drawing, the numeral 1 designates a primary reaction vessel, while the numeral 2 designates a secondary reaction vessel. Both vessels advantageously comprise towers adapted for effecting contact between the gaseous reactants and the catalyst while the catalyst is suspended or dispersed in powdered form in the gaseous reactants during their passage through the reaction vessels.

Referring now to the primary reactor 1, carbon monoxide is continuously withdrawn from a suitable source through a conduit 3 by a compressor 4, which discharges it into the bottom or lower portion of the primary reactor. The carbon monoxide gas stream thus flows upwardly through the reactor and is converted to $CO_2$ which escapes therefrom through a conduit 5.

The catalyst enters the top or upper portion of the reactor from the hopper 6 through a pipe 7. According to one modification, the pipe 7 may communicate with the discharge pipe of the compressor 4, in which case the catalyst powder is forced into the bottom of the reactor by jet action of the entering carbon monoxide stream.

In any case the catalyst in finely powdered form, the particle size ranging from 50 to about 500 microns, is introduced and the rate of gas flow through the reactor adjusted, so that the catalyst powder is suspended in the gas body within the reactor.

A quantity of the catalyst powder accumulates in the lower portion of the reactor behind a suitable baffle 8, from which point a stream of catalyst powder is continuously withdrawn from the reactor through a conduit 9. The catalyst so withdrawn contains metal carbide formed within the reactor as a result of contact with carbon monoxide.

Thus, for example, the catalyst contained in the hopper 6 comprises cobalt deposited on a suitable solid supporting material, such as silica gel, or other solid absorptive material. A temperature of about 390 to 400° F. is maintained within the reactor, and this can be accomplished by suitable heating of the entering gas stream in conventional heating means not shown in the drawing. The flow of gas through the reactor and the rate of catalyst removal therefrom may be controlled so that the residence time of the catalyst in the reactor is of the order of about 1 minute to 60 minutes. Pressure prevailing in the reactor may range from about 1 atmosphere to several atmospheres.

The catalyst containing cobalt carbide being drawn off through the conduit 9 is passed to the secondary reactor 2, as indicated in the drawing. Hydrogen gas is advantageously injected from a pipe 10 into the conduit 9 so as to force the catalyst into the secondary reactor. The hydrogen gas may be heated prior to introduction by conventional means not shown in the drawing. The sensible heat of the entering hydrogen gas as well as that of the catalyst flowing through the conduit 9 is utilized to maintain the required reaction temperature within the secondary reactor. As in the case of the primary reactor, the secondary reactor operation is such that the catalyst is maintained suspended in the body of gas moving through the reactor, for the requisite amount of time to effect decomposition of cobalt carbide and reaction between carbon and hydrogen for the production of hydrocarbon compounds. A temperature of about 300 to 325° F. is advantageously maintained in the secondary reactor; while the rate of gas flow therethrough and catalyst removal therefrom is such as to permit a residence time of the catalyst within the reactor ranging from a few seconds to about 5 minutes. The major portion of the catalyst is drawn off from the baffled section at the bottom of the reactor, and a stream thereof is continuously withdrawn through a conduit 15, communicating with the hopper 6.

A portion of the catalyst powder is carried out of the reactor with the gaseous hydrocarbon products of reaction which are discharged through a pipe 17 leading to a dust separator 18, which may be of the cyclone type. The effluent product stream from the separator 18 is passed through pipe 19 to a secondary separator 20, which may be of the electrical type wherein residual dust is removed. The catalyst dust so removed in the separators 18 and 20 is discharged through the conduits 21 and 22 respectively which also return the reacted catalyst powder to the hopper 6.

The hydrocarbon products including hydrogen, normally gaseous, and normally liquid hydrocarbons, are passed through the pipe 25 to a fractionation unit 26. This unit may comprise one or more individual towers arranged to permit separating the products into their different constituent parts or fractions.

Hydrogen and light gases such as methane and ethane are thus separated from the products in the fractionation unit and discharged therefrom through a pipe 27. The hydrogen and light gases may be passed, all or in part, through a pipe 30 to a conversion unit, referred to later, wherein the gaseous hydrocarbons are used in the production of carbon monoxide.

As indicated, a normally liquid fraction comprising naphtha hydrocarbons may be removed through a pipe 31. Higher boiling hydrocarbons may be withdrawn through a pipe 32.

As previously mentioned, the gas stream introduced to the primary reactor 1 escapes therefrom through a conduit 5. This conduit communicates with a separator 40 wherein provision is made for separating entrained catalyst powder from the gas. The separated catalyst which will contain some cobalt carbide is advantageously passed through conduit 41, which communicates with the previously mentioned conduit 9.

The gas stream flowing from the top of the separator 40 through a pipe 42 comprises a mixture of carbon monoxide and carbon dioxide, the latter being a by-product of the reaction in the primary reactor. This gaseous mixture is then passed to an absorption zone 43 wherein it is subjected to contact with a suitable absorption liquid such as triethanolamine, whereby the carbon dioxide is absorbed and thus removed from the carbon monoxide. The latter is discharged from the top of the absorber 43 through a pipe 44 and, all or in part, returned through a pipe 45 to the primary reactor.

The absorption liquid containing carbon dioxide is drawn off through a pipe 46 to a regenerator 47 wherein it is subjected to sufficiently elevated temperature to strip out the carbon dioxide. Carbon dioxide is discharged through a pipe 48, which communicates with a pipe 49 and by which means all or a portion of the carbon dioxide is passed to the conversion unit 50.

The regenerated absorption liquid is passed to tank 51 from which it is returned through pipe 52 to the absorber 43.

It is contemplated that a portion of the gas stream flowing through the previously mentioned pipe 5 may be passed through a pipe 53 communicating with the pipe 45 for recycling directly to the primary reactor.

In the conversion unit 50 the carbon dioxide is reacted with methane or other normally gaseous hydrocarbon material at a temperature of about 1800° F. or in the range about 1500 to 2000° F. so as to convert these materials into carbon monoxide and hydrogen. The hydrocarbon reactant, such as methane or a methane fraction, is advantageously that removed from the fractionator unit 26 and obtained through the previously mentioned pipe 30 leading to the conversion unit 50.

The gaseous products of the reaction formed in the unit 50 are passed through a pipe 60 to an absorber 61 wherein they may be scrubbed with cuprous chloride or other suitable liquid adapted to effect removal of carbon monoxide from hydrogen. The hydrogen is removed from the absorber through a pipe 62, which also communicates with the pipe 10 for return to the secondary reactor.

The cuprous chloride mixture containing carbon monoxide is drawn off through a pipe 63 to a regenerator 64 wherein suitable temperature and pressure conditions are maintained to effect stripping of the carbon monoxide from the cuprous chloride. The stripped carbon monoxide is conducted through a pipe 65, communicating with the pipe 3.

As an alternative method of preparing carbon monoxide and hydrogen, methane or other light hydrocarbon may be converted in a regenerative type of furnace into hydrogen, leaving carbon deposited on the checkerwork of the furnace. The deposited carbon is then separately reacted with carbon dioxide to produce carbon monoxide.

The method of flow and the type of apparatus employed is subject to modification, for example, each reaction stage may be conducted in a plurality of reactors. There may be either concurrent or countercurrent flow of catalyst powder and reactants through the reactors.

The catalyst may be maintained as a fluidized mass or as a relatively quiescent mass of solid material continuously moving through the reaction zone. The catalyst may be introduced to the reaction zones as a suspension of solids in a liquid medium and the liquid medium may be of such volatility that it vaporizes within the reaction zone thereby taking up exothermic heat of reaction. The vaporized liquid is discharged from the reaction zones together with the reaction products.

A portion of the catalyst accumulating in the hopper 6 may be drawn off continuously through pipe 70 for treatment with hydrogen in a reactivator 80 to remove oily or waxy material that may have accumulated thereon during the course of the reactions. Such hydrogen treatment may be carried out at a temperature ranging from about 400 to 800° F. Treated catalyst is then returned to the system through pipe 71 for use in the reactor 1.

Mention has already been made of using normally gaseous hydrocarbons such as ethane, propane and butane in place of carbon monoxide as the treating agent in the primary reactor. The use of such hydrocarbons is thought to involve absorption of the hydrocarbons on the surface of the catalyst to form methylene groups. These methylene groups are subsequently hydrogenated in the secondary stage. This adsorption of hydrocarbons on the surface of the catalyst may be carried out under relatively high pressure such as 1000–5000 lbs. per square inch while the subsequent hydrogenation step may be carried out at relatively low pressure. Adsorption of such hydrocarbons under elevated pressure is of interest in connection with the use of normally gaseous hydrocarbons available from distillate well operations, such gaseous hydrocarbons being available at pressures in the range mentioned. Therefore, it is contemplated that a stream of these hydrocarbons under well head pressure or substantially well head pressure may be passed through the primary reaction zone and an effluent stream of unreacted hydrocarbons, or other gaseous material from the process may be returned, without substantial reduction in pressure, to an inlet well of a subterranean reservoir from which the gases are originally obtained.

While mention has been made of producing hydrocarbon products it is also contemplated that the process may be employed for the production of oxygenated hydrocarbon compounds including alcohols, aldehydes, etc.

Obviously, many modifications and variations may be made in the invention as herein set forth without departing from the spirit and scope thereof, and therefore only such limitations should be imposed as are indicated in the appended claims.

I claim:

1. A continuous cyclic process for catalytically forming normally liquid compounds from carbon and hydrogen by the action of a solid hydrogenating catalyst containing a carbide-forming metal which comprises passing a stream of said catalyst in finely divided form through a primary reaction in the substantial absence of added free hydrogen, subjecting said stream therein to contact with a volatile carbon compound under elevated temperature conditions such that metallic carbide is formed on said catalyst in substantial amount, passing said catalyst stream containing resulting metal carbide and while still at elevated temperature from the primary reaction zone to a secondary reaction zone, subjecting it in said secondary zone to contact with hydrogen under conditions such that metal carbide is decomposed, the liberated carbon reacting with hydrogen to form carbonaceous compounds mainly of higher molecular weight than methane, discharging said compounds, withdrawing catalyst of decreased carbide content from the secondary zone and passing it to said primary zone for increasing its carbide content.

2. The process according to claim 1 in which the volatile carbon compound is carbon monoxide.

3. A continuous cyclic process for catalytically forming normally liquid hydrocarbons from carbon and hydrogen by the use of a solid hydrogenating catalyst containing a carbide-forming metal selected from the group consisting of cobalt, iron and nickel which comprises passing a stream of said catalyst in powdered form through a primary reaction zone in the substantial absence of added free hydrogen, subjecting the stream to contact therein with a volatile carbon compound at a temperature in the range about 350 to 425° F. such that metallic carbide is formed in the catalyst in substantial amount, passing the catalyst stream containing resulting metallic carbide from the primary zone while still at elevated temperature to a secondary reaction zone, subjecting it therein to contact with hydrogen at a temperature in the range about 200 to 400° F. such that metallic carbide is decomposed and liberated carbon reacts with hydrogen to form hydrocarbon compounds mainly of higher molecular weight than methane, discharging the hydrocarbon compounds, withdrawing catalyst of decreased carbide content from the secondary zone and passing it to said primary zone for increasing its carbide content.

4. The process according to claim 3 in which the carbide-forming metal of the catalyst is cobalt and the volatile carbon compound is carbon monoxide.

5. A continuous cyclic process for catalytically forming normally liquid hydrocarbons from carbon and hydrogen by the use of a solid hydrogenating catalyst containing a carbide-forming metal selected from the group consisting of cobalt, iron and nickel which comprises passing a stream of said catalyst in powdered form through a primary reaction zone in the substantial absence of added free hydrogen, subjecting this stream to contact therein with carbon monoxide at a temperature in the range about 350 to 425° F. such that metallic carbide is formed in substantial amount with formation of carbon dioxide, removing said carbon dioxide from the primary zone, passing the catalyst stream containing resulting metallic carbide from the primary zone while still at elevated temperature to a secondary reaction zone, subjecting it therein to contact with hydrogen at a temperature in the range about 200 to 400° F. such that metallic carbide is decomposed and liberated carbon reacts with hydrogen to form hydrocarbon compounds comprising mainly normally liquid and normally gaseous hydrocarbons of higher molecular weight than methane, discharging the hydrocarbon compounds, withdrawing catalyst of decreased carbide content from the secondary zone, passing it to said primary zone for increasing its carbide content, separating from the discharged hydrocarbon products a normally gaseous hydrocarbon fraction, reacting said gaseous fraction with said carbon dioxide to form carbon monoxide and hydrogen, passing resulting carbon monoxide to the primary reaction zone and passing resulting hydrogen to the secondary reaction zone.

6. A continuous cyclic process for catalytically forming normally liquid hydrocarbons from carbon and hydrogen by the use of a solid hydrogenating catalyst containing a carbide-forming metal selected from the group consisting of cobalt, iron and nickel which comprises continuously passing carbon monoxide gas through a primary reaction zone, introducing to said zone a stream of said catalyst in powdered form, suspending the introduced powder in the body of carbon monoxide gas moving through the reaction zone in the substantial absence of added free hydrogen, maintaining the gas and suspended catalyst powder under elevated temperature conditions such that metal carbide is formed in substantial amount in said catalyst, continuously withdrawing a stream of powdered catalyst containing metal carbide, passing the withdrawn catalyst stream while still at elevated temperature to a secondary reaction zone, suspending it therein in a stream of hydrogen gas passing through said secondary zone, maintaining the body of hydrogen gas and suspended catalyst within the reaction zone under conditions of elevated temperature such that metallic carbide is decomposed and liberated carbon is reacted with hydrogen to form hydrocarbon products mainly of higher molecular weight than methane, discharging said products, continuously withdrawing catalyst powder of decreased carbide content from the secondary zone and returning the withdrawn catalyst to the primary reaction zone.

7. A continuous cyclic process for catalytically forming normally liquid hydrocarbons from carbon and hydrogen which comprises establishing a continuous cyclic stream of powdered solid adsorptive containing cobalt flowing through a pair of separate primary and secondary conversion zones in succession, continuously introducing to the primary zone gas consisting essentially of carbon monoxide, maintaining said powder in contact with carbon monoxide in the primary zone at a temperature of about 390 to 400° F. for a period of time ranging from about 1 to 60 minutes such that cobalt is converted to cobalt carbide in substantial amount in said stream of powder, continuously introducing gas consisting essentially of hydrogen to the secondary zone, maintaining the powder containing cobalt carbide flowing through the secondary zone in contact with said hydrogen at a temperature of about 300 to 325° F. for a time of contact ranging from a few seconds to about 5 minutes such that cobalt carbide is reconverted to the metal and resulting liberated carbon is reacted with hydrogen to form hydrocarbons mainly of higher molecular weight than methane, and continuously discharging hydrocarbon products of reaction from said secondary zone.

8. A continuous cyclic process for catalytically forming normally liquid hydrocarbons from carbon and hydrogen which comprises establishing a continuous cyclic stream of powdered solid adsorptive containing cobalt flowing through a pair of separate primary and secondary conversion zones in succession, continuously introducing to the primary zone gas consisting essentially of carbon monoxide, maintaining said powder in contact with carbon monoxide in the primary zone at a temperature of about 390 to 400° F. for a period of time ranging from about 1 to 60 minutes such that cobalt is converted to cobalt carbide in substantial amount in said stream of powder, continuously introducing gas consisting essentially of hydrogen to the secondary zone, maintaining the powder containing cobalt carbide flowing through the secondary zone in contact wtih hydrogen at a temperature of about 300 to 325° F. for a time of contact ranging from a few seconds to about 5 minutes such that cobalt carbide is re-converted to metal and resulting liberated carbon is reacted with hydrogen to form normally liquid and normally gaseous hydrocarbons mainly of higher molecular weight than methane, continuously discharging said hydrocarbon products from the secondary zone, separating from the discharged products a normally gaseous hydrocarbon fraction, reacting said gaseous fraction with carbon dioxide to form carbon monoxide and hydrogen, passing resulting carbon monoxide to the primary reaction zone and passing resulting hydrogen to the secondary zone.

9. A continuous cyclic process for catalytically forming normally liquid hydrocarbons from carbon and hydrogen which comprises passing carbon monoxide in the substantial absence of hydrogen to a primary reaction zone, subjecting said carbon monoxide to contact therein with a finely-divided solid synthesis catalyst containing a carbide forming metal, effecting said contact under conditions of elevated temperature such that carbon monoxide reacts with said metal to form metal carbide in substantial amount, separately removing catalyst and resulting gaseous products from said primary zone, passing removed catalyst at elevated temperature to a secondary reaction zone, passing hydrogen in the substantial absence of carbon monoxide to said secondary zone, subjecting said hydrogen to contact with said hot catalyst containing metal carbide in the secondary zone under predetermined temperature conditions such that metal carbide is decomposed and resulting liberated carbon is reacted with hydrogen to form hydrocarbons mainly of higher molecular weight than methane, separately removing catalyst of decreased carbide content and resulting hydrocarbon products from said secondary zone, and recycling removed catalyst of decreased carbide content to said primary zone.

10. A continuous cyclic process for catalytically forming normally liquid hydrocarbons from carbon and hydrogen which comprises passing carbon monoxide in the substantial absence of hydrogen to a primary reaction zone, subjecting said carbon monoxide to contact therein with a finely-divided solid synthesis catalyst containing a carbide forming metal, effecting said contact under conditions of elevated temperature such that carbon monoxide reacts with said metal to form metal carbide in substantial amount, separately removing catalyst and resulting gaseous products including carbon dioxide from said primary zone, passing removed catalyst at elevated temperature to a secondary reaction zone, passing hydrogen in the substantial absence of carbon monoxide to said secondary zone, subjecting said hydrogen to contact with said hot catalyst containing metal carbide in the secondary zone under predetermined temperature conditions such that metal carbide is decomposed and resulting liberated carbon is reacted with hydrogen to form hydrocarbons mainly of higher molecular weight than methane, separately removing catalyst of decreased carbide content and resulting hydrocarbon products from said secondary zone, recycling removed catalyst of decreased carbide content to said primary zone, separating carbon dioxide from said gaseous products removed from the primary reaction zone, reacting carbon dioxide so separated with a normally gaseous hydrocarbon under conditions such as to form carbon monoxide and hydrogen, passing resulting carbon monoxide to the primary zone, and passing resulting hydrogen to the secondary zone.

11. A continuous cyclic process for catalytically forming normally liquid hydrocarbons from carbon and hydrogen which comprises passing carbon monoxide in the substantial absence of hydrogen to a primary reaction zone, subjecting said carbon monoxide to contact therein with a finely-divided solid synthesis catalyst containing a carbide forming metal, effecting said contact under conditions of elevated temperature such that carbon monoxide reacts with said metal to form metal carbide in substantial amount, separately removing catalyst and resulting gaseous products including carbon dioxide and unreacted carbon monoxide from said primary zone, separating carbon dioxide from the carbon monoxide in said gaseous products, recycling residual carbon monoxide to the primary zone, passing removed catalyst at elevated temperature to a secondary reaction zone, passing hydrogen in the substantial absence of carbon monoxide to said secondary zone, subjecting said hydrogen to contact with said hot catalyst containing metal carbide in the secondary zone under predetermined temperature conditions such that metal carbide is decomposed and resulting liberated carbon is reacted with hydrogen to form hydrocarbons mainly of higher molecular weight than methane, separately removing catalyst of decreased carbide content and resulting hydrocarbon products from said secondary zone, recycling removed catalyst of decreased carbide content to said primary zone, separating carbon dioxide from said gaseous products removed from the primary reaction zone, reacting carbon dioxide so separated with a normally gaseous hydrocarbon under conditions such as to form carbon monoxide and hydrogen, passing resulting carbon monoxide to the primary zone, and passing resulting hydrogen to the secondary zone.

12. A continuous cyclic process for catalytic conversion of carbon and hydrogen into normally liquid hydrocarbons which comprises maintaining a stream of finely-divided solid synthesis catalyst containing a carbide-forming metal flowing in succession through a primary and then a secondary conversion zone in a continuously recurring cycle, reacting said catalyst in the primary zone with at least one volatile carbon compound supplied to the primary zone substantially free of hydrogen, under elevated temperature conditions such that metallic carbide is formed on said catalyst in substantial amount, subjecting resulting carbide containing catalyst while in said secondary zone to contact with hydrogen under conditions such that metallic carbide is decomposed, the liberated carbon reacting with hydrogen to form carbon containing compounds mainly of higher molecular weight than methane, and discharging resulting compounds from the secondary reaction zone.

13. A continuous cyclic process for catalytic conversion of carbon and hydrogen into normally liquid hydrocarbons, which comprises maintaining a stream of finely-divided solid synthesis catalyst containing a carbide-forming metal flowing in succession through a primary and then a secondary conversion zone in a continuously recurring cycle, subjecting said catalyst while in the primary zone to contact with gas consisting of carbon monoxide under elevated temperature conditions such that metallic carbide is formed on said catalyst in substantial amount, subjecting resulting carbide containing catalyst while in said secondary zone to contact with hydrogen under conditions such that metallic carbide is decomposed, the liberated carbon reacting with hydrogen to form carbon containing compounds mainly of higher molecular weight than methane, and discharging resulting compounds from the secondary reaction zone.

14. A continuous cyclic process for catalytic conversion of carbon and hydrogen into normally liquid hydrocarbons, which comprises maintaining a stream of finely-divided solid synthesis catalyst containing a carbide-forming metal flowing in succession through a primary and then a secondary conversion zone in a continuously recurring cycle, reacting said catalyst in the primary zone with carbon monoxide supplied to the primary zone substantially free of hydrogen, under elevated temperature conditions such that metallic carbide is formed on said catalyst in substantial amount, subjecting resulting carbide containing catalyst while in said secondary zone to contact with hydrogen under conditions such that metallic carbide is decomposed, the liberated carbon reacting with hydrogen to form carbon containing compounds mainly of higher molecular weight than methane, and discharging resulting compounds from the secondary reaction zone.

HAROLD V. ATWELL.